US006842945B2

(12) United States Patent
Hiramatsu

(10) Patent No.: US 6,842,945 B2
(45) Date of Patent: Jan. 18, 2005

(54) HINGE MECHANISM

(75) Inventor: Minoru Hiramatsu, Yokohama (JP)

(73) Assignee: Ohi Seisakusho Co., Ltd., Kanagawa (JP)

(*) Notice: Subject to any disclaimer, the term of this patent is extended or adjusted under 35 U.S.C. 154(b) by 0 days.

(21) Appl. No.: 10/345,380

(22) Filed: Jan. 16, 2003

(65) Prior Publication Data

US 2004/0139580 A1 Jul. 22, 2004

(51) Int. Cl.[7] .............................. B60J 5/00; E05D 3/06; E05D 11/06

(52) U.S. Cl. ....................... 16/366; 16/371; 296/146.11

(58) Field of Search .................. 16/366, 334, 370–371, 16/332; 296/146.1, 146.11

(56) References Cited

U.S. PATENT DOCUMENTS 5,067,201 A * 11/1991 Marchione ................... 16/270
5,561,887 A * 10/1996 Neag et al. ................... 16/334
5,685,046 A * 11/1997 Neag et al. ................... 16/366
6,550,845 B1 * 4/2003 Pietryga ...................... 16/366
6,591,452 B2 * 7/2003 Jacquin ....................... 16/366
6,681,448 B2 * 1/2004 Liang .......................... 16/336

FOREIGN PATENT DOCUMENTS

JP 2501675 3/1996

* cited by examiner

*Primary Examiner*—Thomas B. Will
*Assistant Examiner*—Tara L. Mayo
(74) *Attorney, Agent, or Firm*—Sughrue Mion, PLLC

(57) ABSTRACT

A hinge mechanism having first and second pivot shafts held by first and second hinge base members, respectively, which also connect to ends of a hinge arm member. First and second cams on the first and second hinge base members engage first and second control levers on the ends of the hinge arm members. First and second cam portions are provided by the opposed ends of the hinge arm member respectively and engage first and second pivotable check plates. First and second follower members are mounted on the first and second check plates respectively and contactable with the first and second cam portions respectively. First and second springs bias the first and second check plates in a direction to press the first and second follower members on the first and second cam portions respectively. A third spring biases a link member toward the first hinge base member.

14 Claims, 14 Drawing Sheets

HINGE MECHANISM

BACKGROUND OF INVENTION

1. Field of Invention

The present invention relates in general to hinge mechanisms and more particularly to hinge mechanisms of a so-called “wide open type” that is suitable for a vehicle door, enabling the door to open largely by an angle exceeding 90 degrees.

2. Description of Related Art

One of the known hinge mechanisms of the above-mentioned wide open type is shown in Japanese Patent 2501675. The hinge mechanism of this Patent is of a double pivot type that enables an associated vehicle door to open by an angle of about 270 degrees. The hinge mechanism of the double pivot type comprises generally a first pivot shaft, a second pivot shaft and a switching unit that switches the door pivoting between a first pivot mode wherein the door pivots about the first pivot shaft and a second pivot mode wherein the door pivots about the second pivot shaft. However, when assembling the hinge mechanism of the Patent, difficult and time-consumed assembling work is inevitably needed due to a large number of parts to be used for the hinge mechanism. Furthermore, for achieving a precise operation of the switching unit, skilled setting work is needed by the switching unit. Of course, these necessities bring about increase in cost of the product, viz., hinge mechanism.

SUMMARY OF INVENTION

Thus, it is an object of the present invention to provide a hinge mechanism that is free of the above-mentioned drawbacks.

According to the present invention, there is provided a hinge mechanism that is simple in construction, easy to assemble and low in cost, while enabling a smoothed and widely opening operation of the door.

According to a first aspect of the present invention, there is provided a hinge mechanism for pivotally connecting a door to a vehicle body, which comprises first and second hinge base members adapted to be connected to the vehicle body and the door respectively; first and second pivot shafts held by the first and second hinge base members respectively; a hinge arm member having a first end portion pivotally connected to the first hinge base member through the first pivot shaft and a second end portion pivotally connected to the second hinge base member through the second pivot shaft; first and second cams provided by the first and second hinge base members respectively; a first control lever pivotally connected to the first end portion of the hinge arm member and having a leading end contactable with the first cam; a second control lever pivotally connected to the second end portion of the hinge arm member and having a leading end contactable with the second cam; a link member having opposed ends pivotally connected to the first and second control levers respectively; first and second cam portions provided by the first and second end portions of the hinge arm member respectively; first and second check plates pivotally connected to the first and second hinge base members respectively; first and second follower members mounted on the first and second check plates respectively and contactable with the first and second cam portions respectively; and first and second biasing members for biasing the first and second check plates in a direction to press the first and second follower members on the first and second cam portions respectively.

According to a second aspect of the present invention, there is provided a hinge mechanism for pivotally connecting a door to a vehicle body, which comprises first and second hinge base members adapted to be connected to the vehicle body and the door respectively; first and second pivot shafts held by the first and second hinge base members respectively; a hinge arm member having a first end portion pivotally connected to the first hinge base member through the first pivot shaft and a second end portion pivotally connected to the second hinge base member through the second pivot shaft; first and second cams provided by the first and second hinge base members respectively; a first control lever pivotally connected to the first end portion of the hinge arm member and having a leading end contactable with the first cam; a second control lever pivotally connected to the second end portion of the hinge arm member and having a leading end contactable with the second cam; a link member having opposed ends pivotally connected to the first and second control levers respectively; and a biasing member that biases the link member toward the first hinge base member.

According to a third aspect of the present invention, there is provided a hinge mechanism for pivotally connecting a door to a vehicle body, which comprises first and second hinge base members adapted to be connected to the vehicle body and the door respectively; first and second pivot shafts tightly held by the first and second hinge base members respectively; a hinge arm member having a first end portion pivotally connected to the first pivot shaft and a second end portion pivotally connected to the second pivot shaft; first and second cams provided by the first and second pivot shafts respectively; a first control lever pivotally connected to the first end portion of the hinge arm member and having a leading end contactable with the first cam; a second control lever pivotally connected to the second end portion of the hinge arm member and having a leading end contactable with the second cam; a link member having opposed ends pivotally connected to the first and second control levers respectively; first and second cam portions integrally formed on the first and second end portions of the hinge arm member respectively; first and second check plates pivotally connected to the first and second hinge base members respectively; first and second press rollers rotatably mounted on the first and second check plates respectively and contactable with the first and second cam portions respectively; first and second springs that bias the first and second check plates in a direction to press the first and second press rollers on the first and second cam portions respectively; and a third spring that biases the link member toward the first hinge base member.

BRIEF DESCRIPTION OF DRAWINGS

Other objects and advantages of the present invention will become apparent from the following description when taken in conjunction with the accompanying drawings, in which.

DETAILED DESCRIPTION OF INVENTION

In the following, the present invention will be described in detail with reference to the accompanying drawings.

For ease of understanding, various directional terms, such as, right, left, upper, lower, rightward and the like are used in the following description. However, such terms are to be understood with respect to only a drawing or drawings on which a corresponding part or portion is shown.

Figure 1:
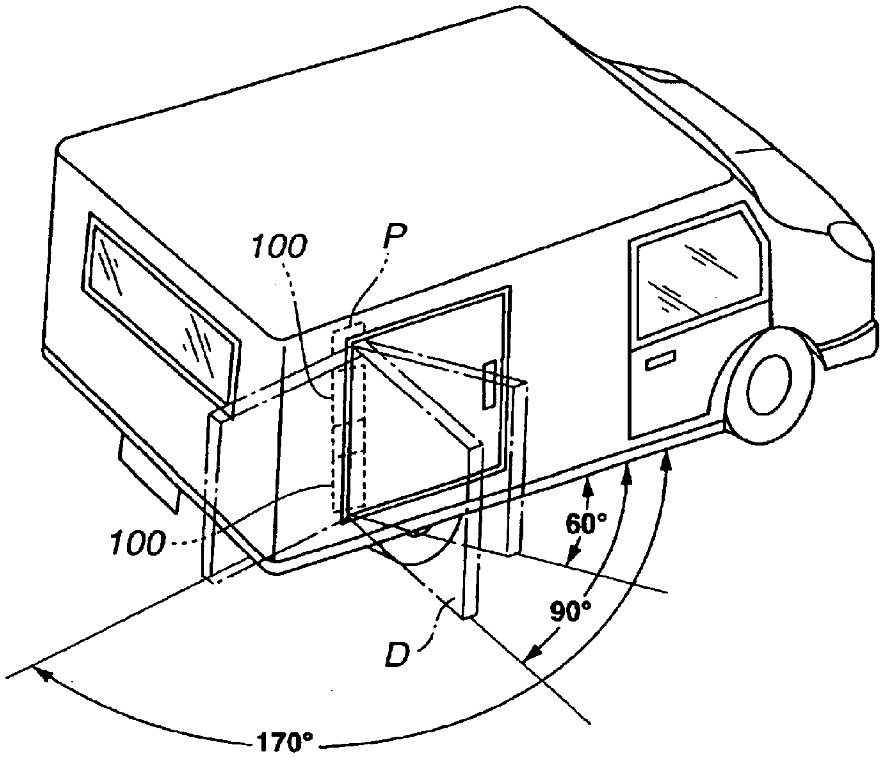
FIG. 1 is a perspective view of a motor vehicle to which a rear door is pivotally connected through a hinge mechanism according to the present invention.

Referring to FIG. 1, there is shown a motor vehicle to which a rear door "D" is pivotally connected through two hinge mechanisms 100 of the present invention. As will become apparent as the description proceeds, each hinge mechanism 100 has one side portion secured to a pillar "P" of the vehicle and the other side portion secured to the rear door "D".

Referring to FIGS. 2 to 7, there is shown the detail of the hinge mechanism 100 of the present invention.

Figure 2:
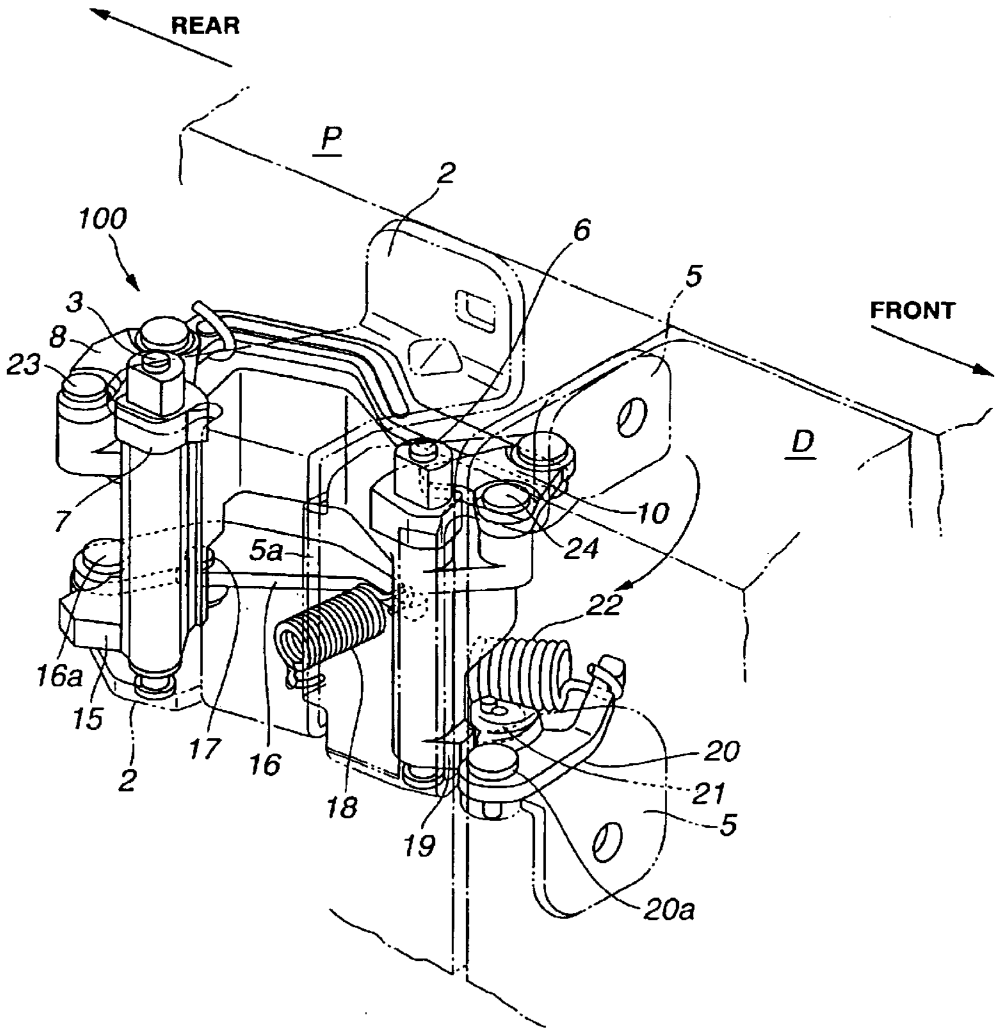
FIG. 2 is a perspective view of the hinge mechanism in a closed condition in association with both a vehicle body and the rear door to which the hinge mechanism is connected.
Figure 3:
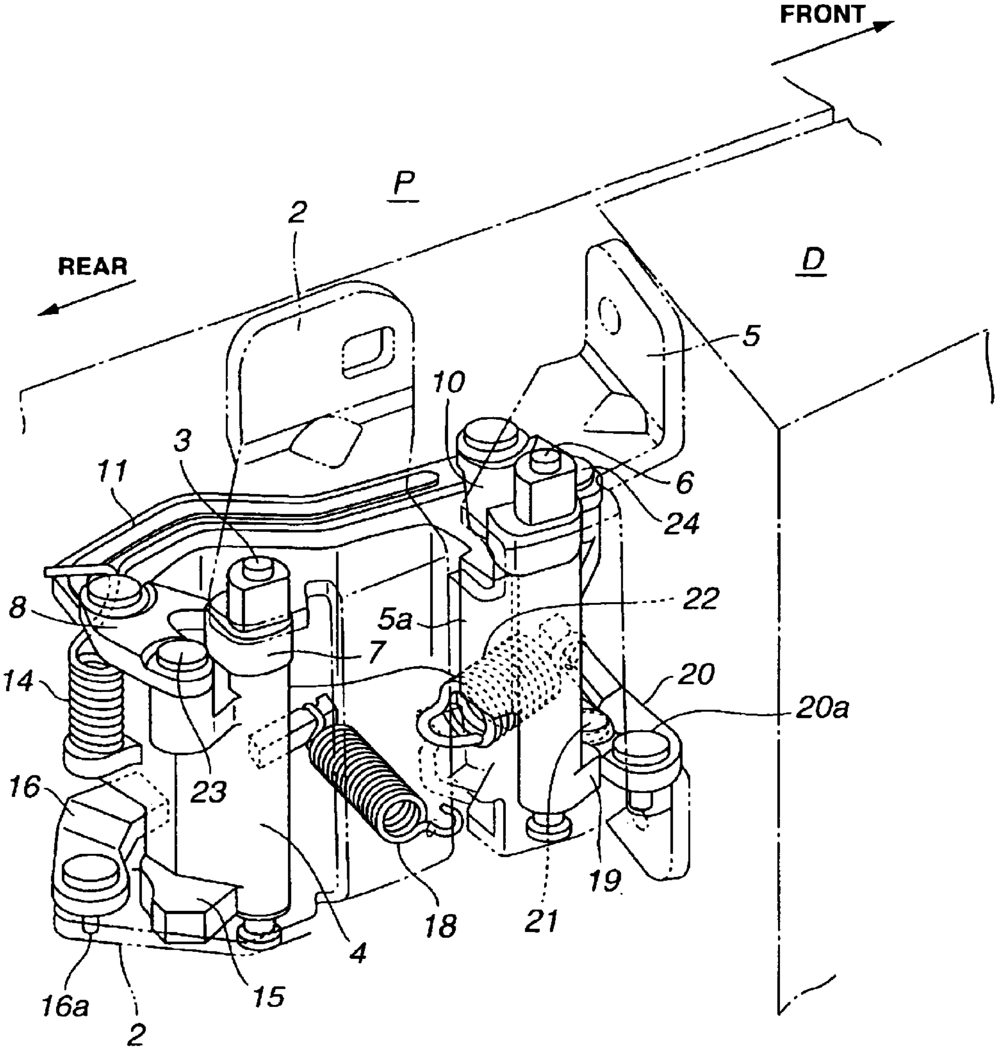
FIG. 3 is a view similar to FIG. 2, but showing a view taken from a different angle.

In FIGS. 2 and 3, denoted by numeral 2 is a first hinge base member that is secured to the pillar "P" of the vehicle body. As is understood from these drawings, the first hinge base member 2 is in the shape of arch having opposed end portions secured to the pillar "P" and a raised center portion extending between the opposed end portions. A first pivot shaft 3 is tightly held by shank sections of the raised center portion of the first hinge base member 2.

Figure 4:
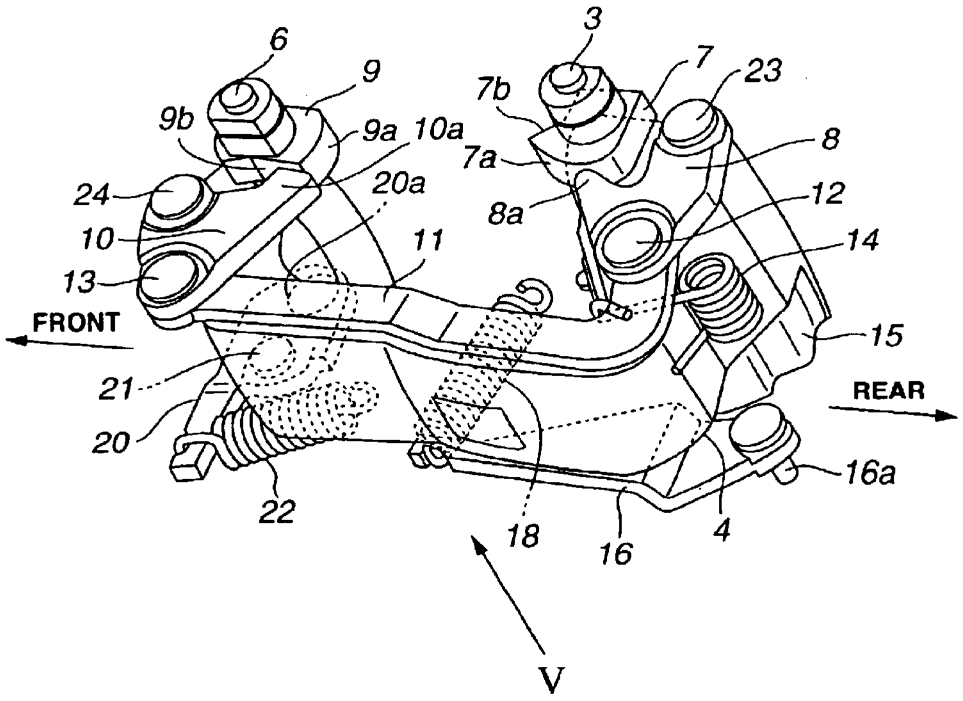
FIG. 4 is a perspective view of an inner construction of the hinge mechanism in a closed condition with first and second hinge base members removed.

As is understood from FIG. 4, a hinge arm member 4 has one end pivotally held by the first pivot shaft 3. That is, the end of the hinge arm member 4 is pivotally connected to the first hinge base member 2 through the first pivot shaft 3.

Referring back to FIGS. 2 and 3, denoted by numeral 5 is a second hinge base member that is secured to a rear end of the rear door "D" (see FIG. 1). Like the first hinge base member 2, the second hinge base member 5 is in the shape of arch having opposed end portions secured to the door "D" and a raised center portion extending between the opposed end portions. A second pivot shaft 6 is tightly held by shank sections of the raised center portion of the second hinge base member 5.

As is understood from FIG. 4, the other end of the hinge arm member 4 is pivotally held by the second pivot shaft 6. That is, the other end of the hinge arm member 4 is pivotally connected to the second hinge base member 5 through the second pivot shaft 6.

Thus, the opposed ends of the hinge arm member 4 are pivotally connected to the pillar "P" of the vehicle body and the door "D" respectively, so that the door "D" can swing relative to the vehicle body, using the first and second pivot shafts 3 and 6 as pivots.

As is seen from FIG. 4, the first pivot shaft 3 is equipped at an upper portion thereof with a first cam 7 that comprises a curved surface part 7*a* and an inclined surface part 7*b*. The first cam 7 is secured to the first pivot shaft 3 that is secured to the first hinge base member 2. A first control lever 8 is pivotally connected to the hinge arm member 4 through a pivot pin 23 and arranged to slidably contact with the first cam 7.

Like the first pivot shaft 3, the second pivot shaft 6 is equipped at an upper portion thereof with a second cam 9 that comprises a curved surface part 9*a* and an inclined surface part 9*b*. The second cam 9 is secured to the second pivot shaft 6 that is secured to the second hinge base member 5. A second control lever 10 is pivotally connected to the hinge arm member 4 through a pivot pin 24 and arranged to slidably contact with the second cam 9.

As is seen from FIG. 4, a link member 11 extends along an upper ridge of the hinge arm member 4. One end of the link member 11 is pivotally connected to the first control lever 8 through a first connecting pin 12, and the other end of the link member 11 is pivotally connected to the second control lever 10 through a second connecting pin 13. Thus, with provision of the link member 8, the first and second control levers 8 and 10 are cooperated with each other.

A coil spring 14 is mounted on the hinge arm member 4 and arranged to bias the link member 11 rightward in FIG. 4, that is, toward the first hinge base member 2. That is, the biasing spring 14 has one end hooked to the hinge arm member 4 and the other end hooked to the link member 11.

Figure 5:
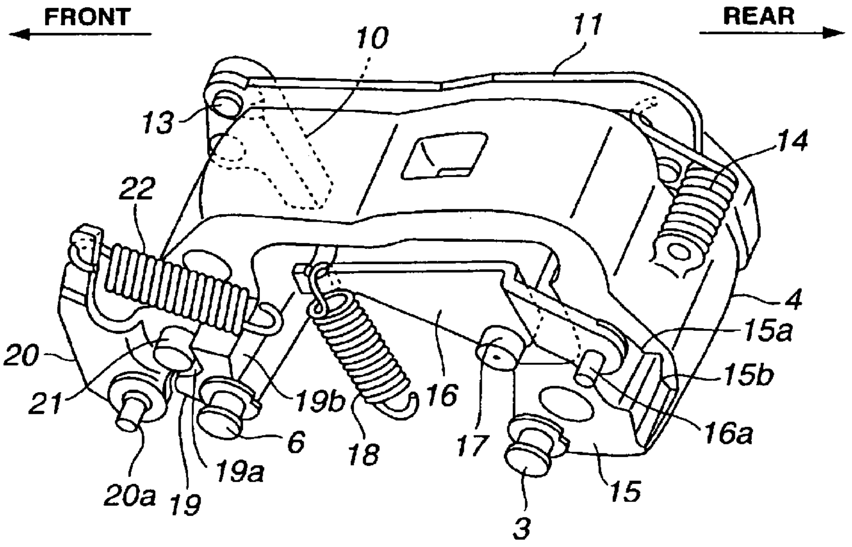
FIG. 5 is a view similar to FIG. 4, but showing a back view taken from the direction of "V" of FIG. 4.
Figure 6:
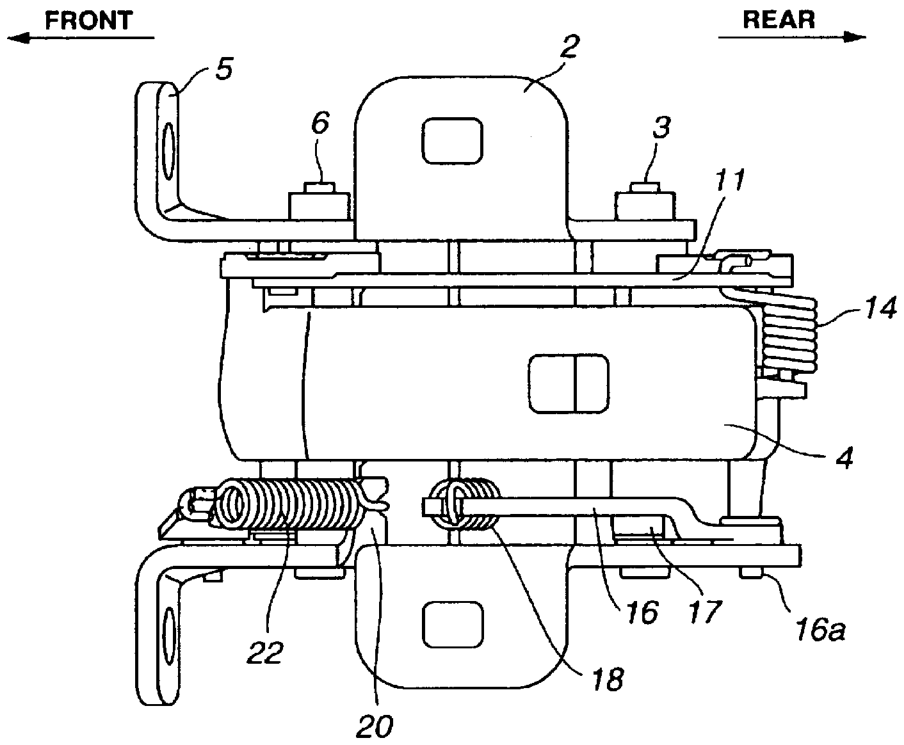
FIG. 6 is a side view of the hinge mechanism of the invention, that is taken from the interior of the vehicle body.
Figure 7:
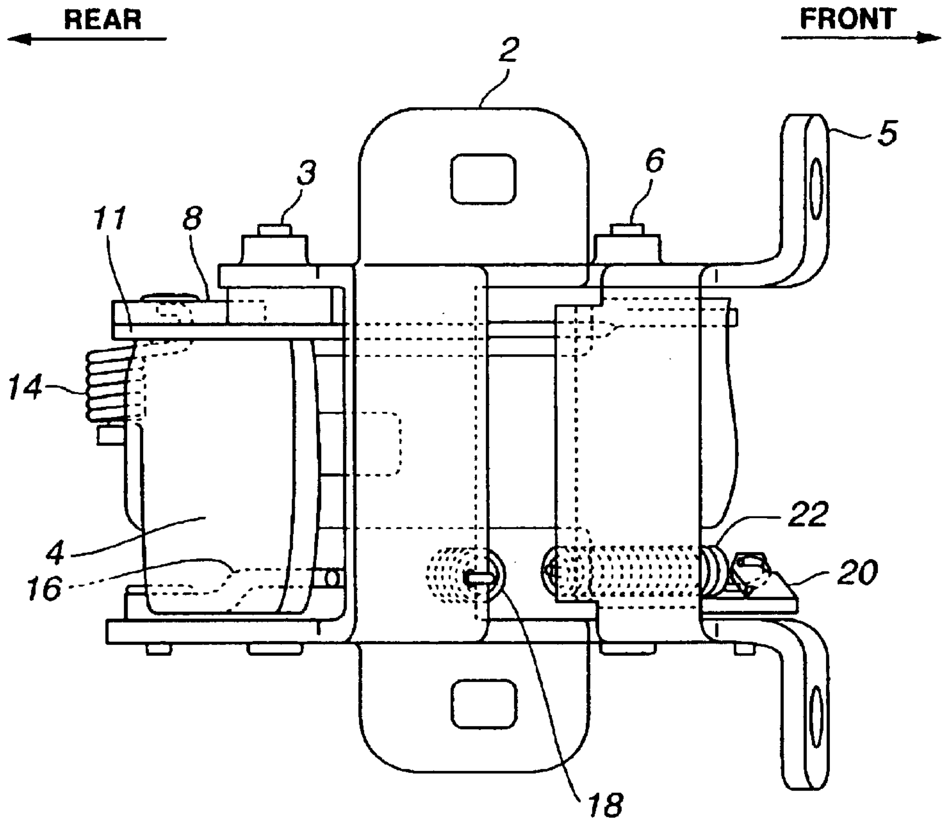
FIG. 7 is a side view of the hinge mechanism of the invention, that is taken from the exterior of the vehicle body.

As is seen from FIG. 5, the right end of the hinge arm member 4 is formed at a bottom edge thereof with a cam portion 15. A first check plate 16 is pivotally connected to the first hinge base member 2 (see FIGS. 2 and 3) through a pin 16*a*. A press roller 17 rotatably connected to the first check plate 16 is arranged to slidably contact a cam surface of the cam portion 15. Due to provision of a coil spring 18, the first check plate 16 is constantly biased toward the cam portion 15, that is, in a direction to press the press roller 17 against the cam surface of the cam portion 15. As is seen from FIG. 3, the spring 18 has one end hooked to the first hinge base member 2 and the other end hooked to the first check plate 16.

Referring back to FIG. 5, the right end of the hinge arm member 4 is formed at a bottom edge thereof with another cam portion 19 that functions to restrict a pivoting movement of the door "D" as will become apparent as the description proceeds. A second check plate 20 is pivotally connected to the second hinge base member 5 (see FIGS. 2 and 3) through a pin 20*a*. A press roller 21 rotatably connected to the second check plate 20 is arranged to slidably contact a cam surface of the cam portion 19. Due to provision of a coil spring 22, the second check plate 20 is constantly biased toward the cam portion 19, that is, in a direction to press the press roller 21 against the cam surface of the cam portion 19. As is seen from FIG. 3, the spring 22 has one end hooked to the second hinge base member 5 and the other end hooked to the second check plate 20. As will become apparent hereinafter, the cam portion 19, the second check plate 20, the press roller 21 and the spring 22 constitute a check mechanism that provides a critical angular position at which biasing force applied to the door "D" changes its operation direction.

In the following, operation of the hinge mechanism 100 will be described with reference to the drawings.

Figure 8:
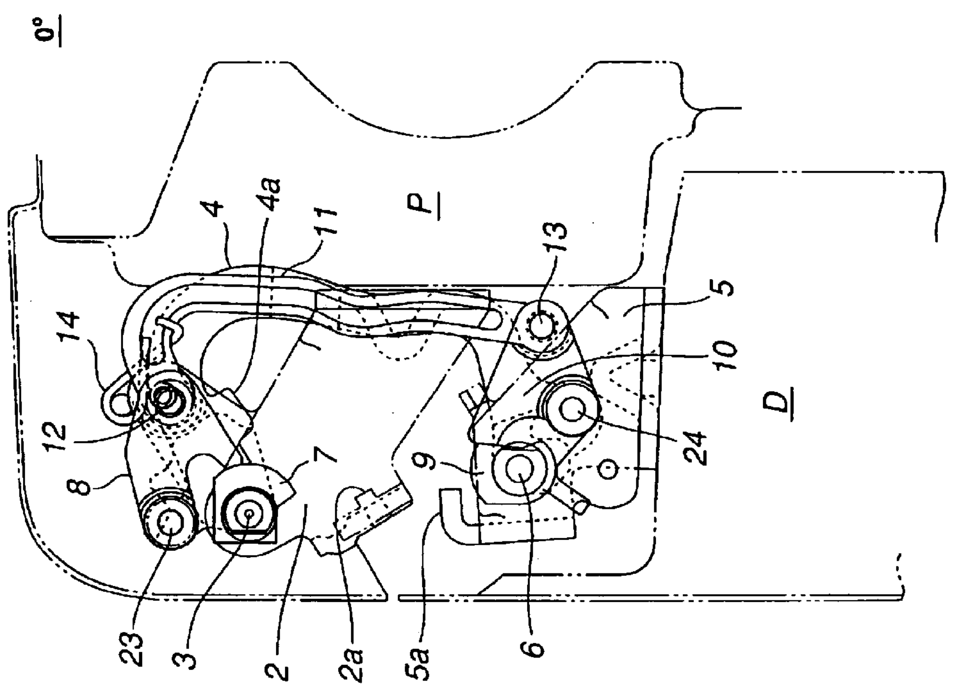
FIG. 8 is a top view of the hinge mechanism under a condition wherein the rear door is fully closed.
Figure 11:
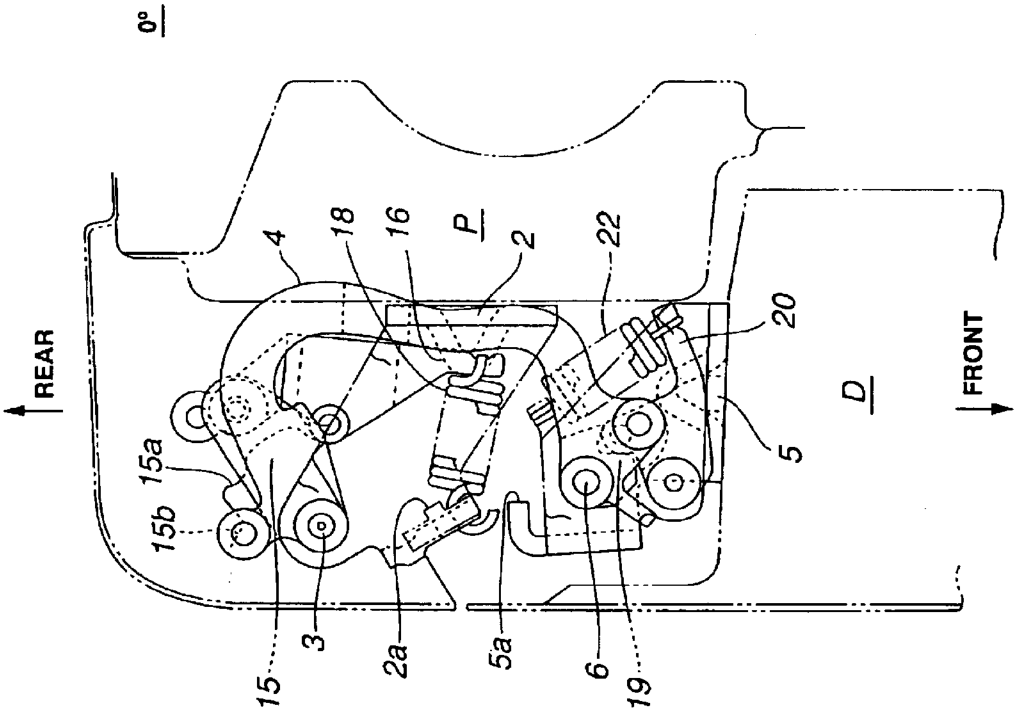
FIG. 11 is a view similar to FIG. 8, but a view with some upper parts removed.

0-Degree Position (FIGS. 8 and 11)

First, description will be commenced with respect to a fully closed position of the rear door "D" relative to a door opening of the vehicle body.

Under this condition, the hinge mechanism 100 assumes its closed condition causing the parts thereof to assume their original positions, as shown in FIGS. 2, 3, 4, 5, 8 and 11. That is, as is best understood from FIG. 4, in this closed condition, a leading end 8*a* of the first control lever 8 contacts the curved surface part 7*a* of the first cam 7, while, a leading end 10*a* of the second control lever 10 contacts the inclined surface part 9*b* of the second cam 9. And, as is seen from FIG. 5, the press roller 17 of the first check plate 16 is put on an end part of the cam surface of the cam portion 15, and the press roller 21 of the second check plate 20 is put in a recess 19*a* formed in the cam surface of the cam portion 19.

Figure 12:
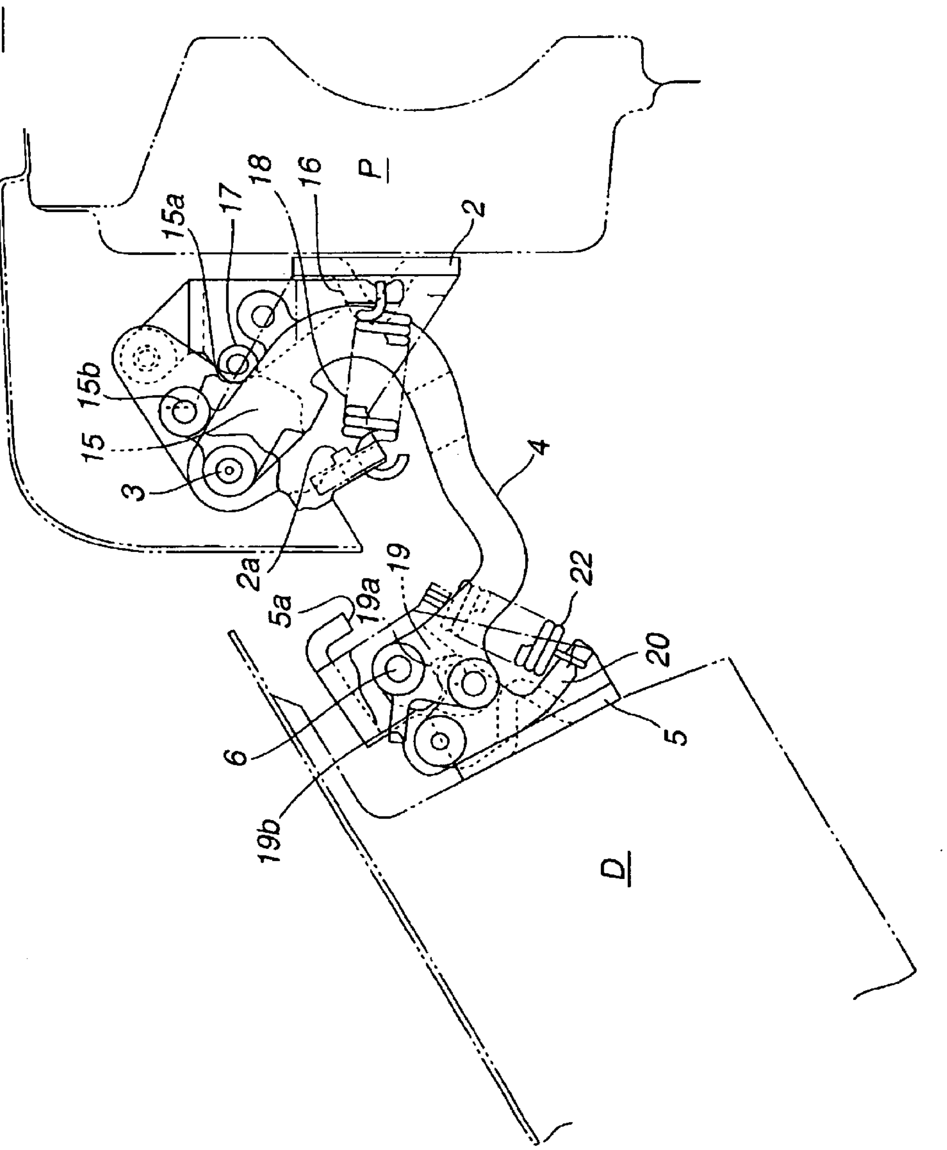
FIG. 12 is a view similar to FIG. 9, but showing a condition wherein the rear door assumes 60-degree open Position.

Opening Pivoting from 0-Degree Position to 60-Degree Position (FIG. 12)

When, now, after releasing a locked condition of a lock unit (not shown) of the door "D", the door "D" is pulled outward, the hinge arm member 4 is pivoted with the door "D" about the first pivot shaft 3 in a clockwise direction in FIG. 4 permitting an open movement of the door "D" in the same direction. During this, the leading end of the first control lever 8 slides on the curved surface part 7*a* of the first cam 7 and at the same time, as is seen from FIG. 5, the press roller 17 of the first check plate 16 runs toward a first recess 15*a* (see FIG. 12) of the cam surface of the cam portion 15. When, now, the door "D" comes to an angular position of 60 degrees, the press roller 17 is put into the first recess 15*a* of the cam portion 15 as is seen from FIG. 9. Upon this, the door "D" takes a first check position while exhibiting a certain resiliency produced by the construction of the hinge mechanism 100 including three springs 14, 18 and 22. That is, when taking the check position, the door "D" is applied with a certain check force produced by the springs 14, 18 and 22.

That is, when the door "D" is pivoted from 0-degree Position to 60-degree Position, the leading end of the first control lever 8 travels on the curved surface part 7*a* while being prevented from making a rotation thereby suppressing rotation of the second control lever 10 through the link member 11. Thus, during such pivoting of the door "D", the contact between the second control lever 10 and the inclined surface part 9*b* of the second cam 9 is kept. That is, the turning of the door "D" from 0-degree Position to 60-degree Position is made about the first pivot shaft 3, not about the second pivot shaft 6.

Figure 9:
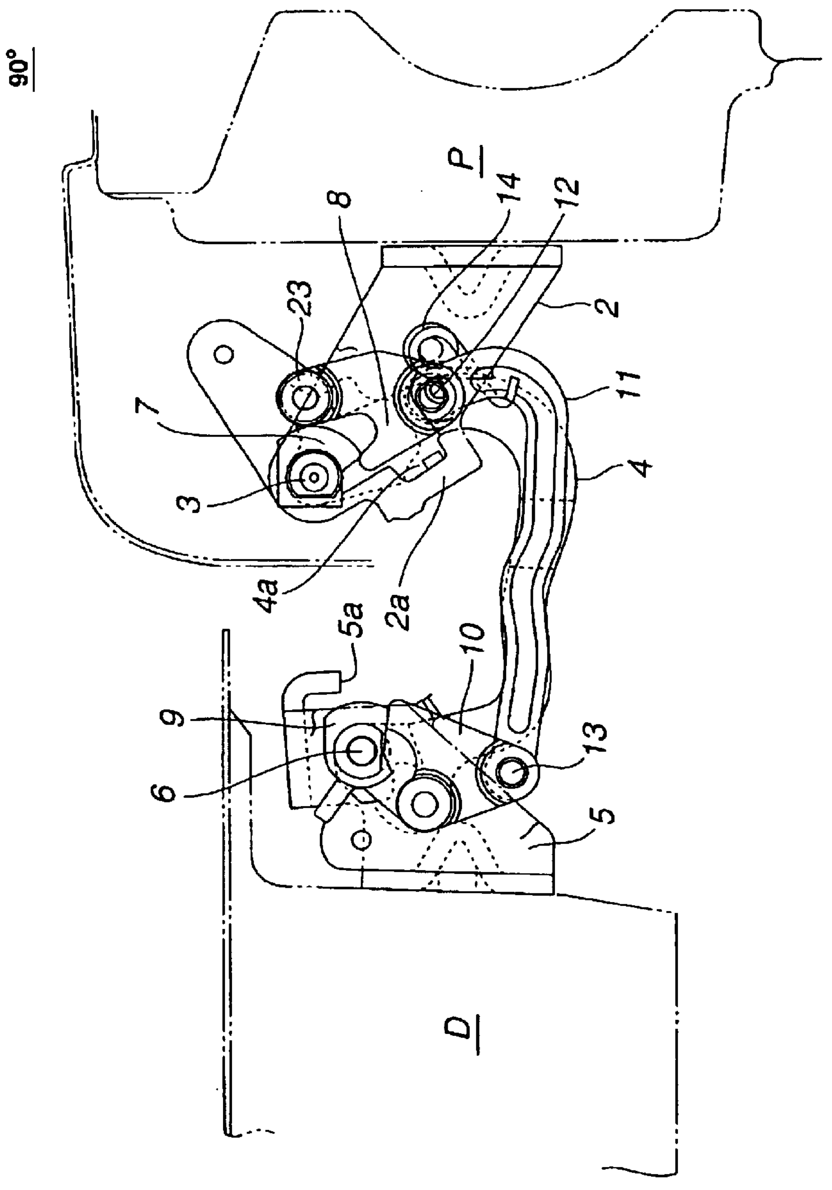
FIG. 9 is a top view of the hinge mechanism under a condition wherein the rear door assumes 90-degree open Position.
Figure 13:
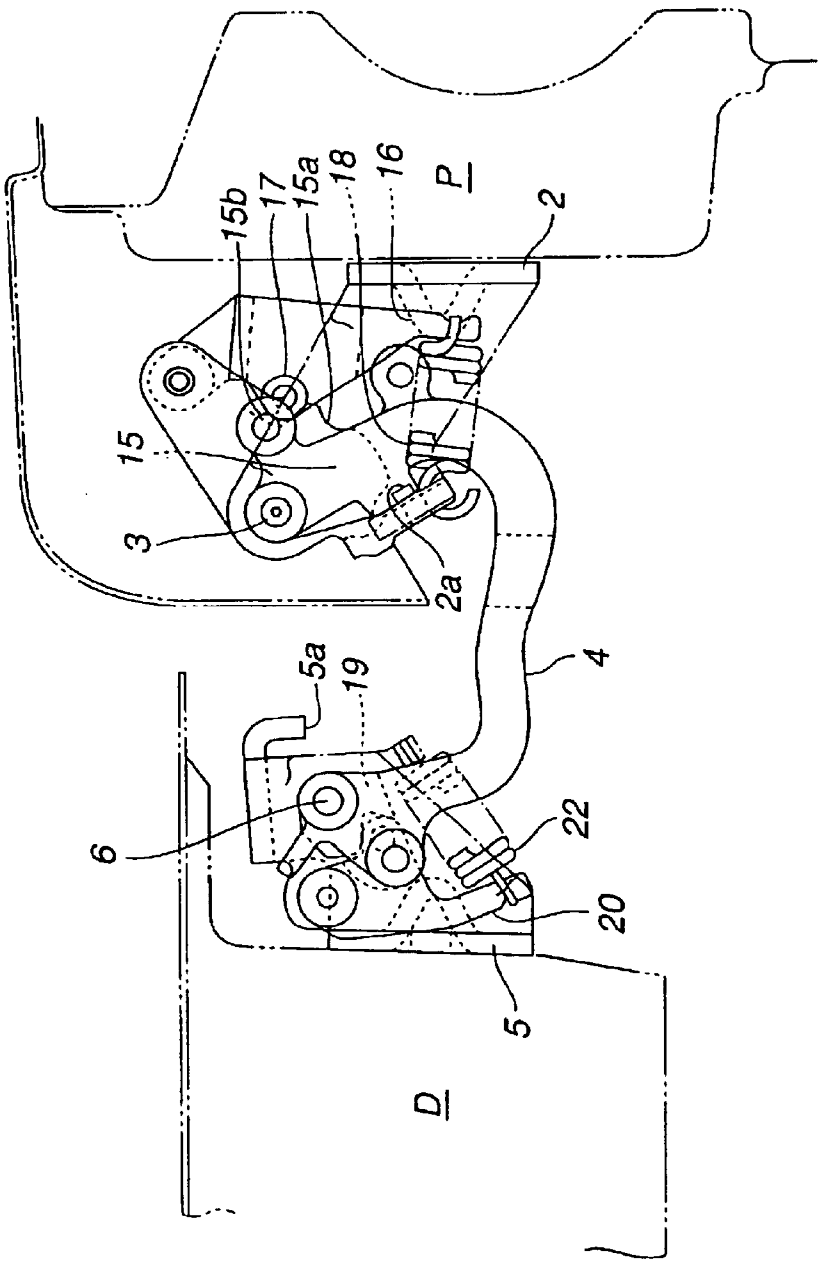
FIG. 13 is a view similar to FIG. 9, but a view with some upper parts removed.

Opening Pivoting from 60-Degree Position to 90-Degree Position (FIGS. 9 and 13)

When then the door "D" is pulled further with a force greater than the certain check force applied thereto, the press roller 17 of the first check plate 16 gets out the first recess 15*a* and runs toward a second recess 15*b* (see FIG. 13) formed on the cam surface of the cam portion 15. When, the door "D" comes to an angular position of 90 degrees, the press roller 17 of the first check plate 16 is put into the second recess 15*b* of the cam portion 15, as is seen from FIG. 13. Upon this, the door "D" takes a second check position while exhibiting the certain resiliency for the same reason as mentioned hereinabove.

During this pivoting, the leading end of the first control lever 8 travels on the curved surface part 7*a* and comes to an end of the same carrying out the same operation as that effected in case of the above-mentioned pivoting from 0-degree Position to 60-degree Position.

It is to be noted that as is seen from FIG. 9, when the door "D" assumes 90-degree Position, a projection 4*a* formed on the hinge arm member 4 contacts a raised part 2*a* of the first hinge base member 2. This means that a further opening pivoting of the door "D" about the first pivot shaft 3 is suppressed.

Figure 10:
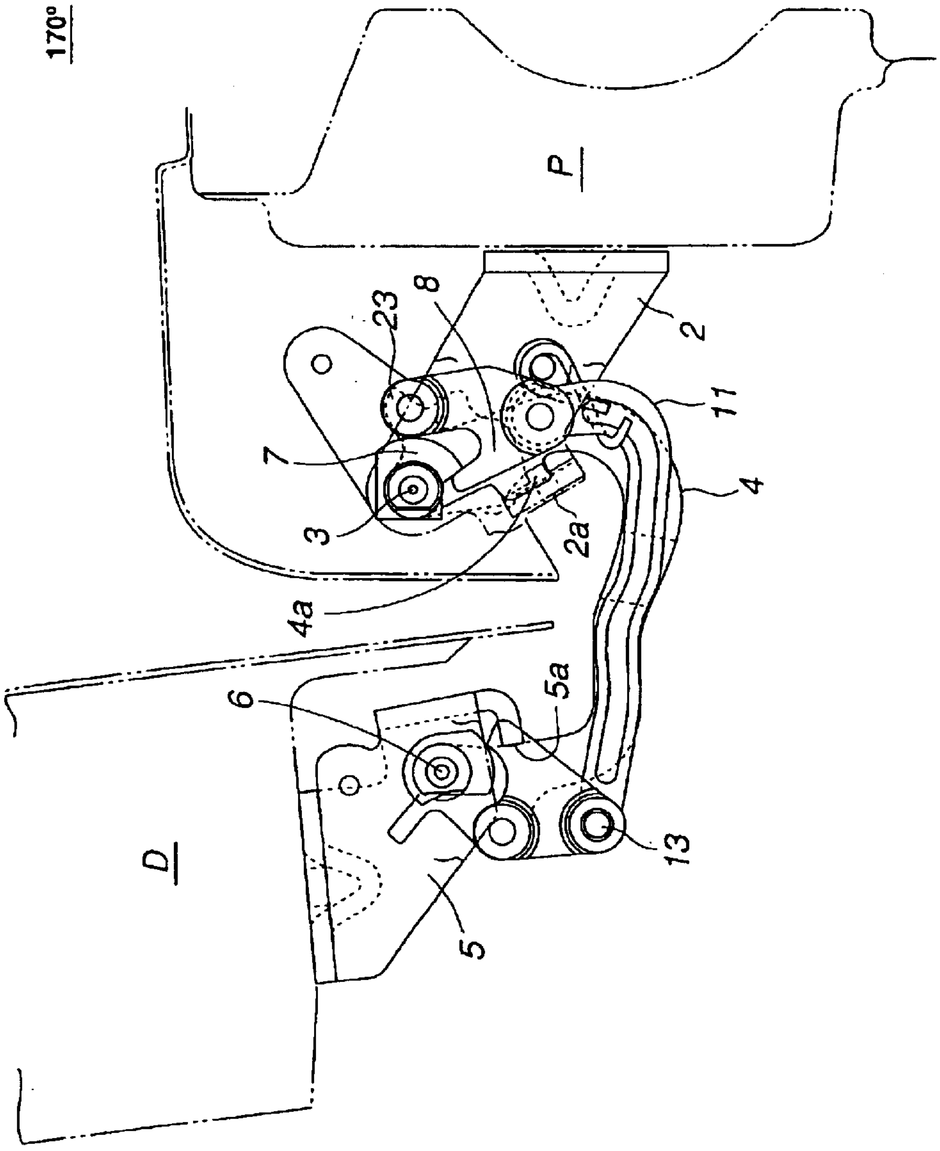
FIG. 10 is a top view of the hinge mechanism under a condition wherein the rear door assumes 170-degree open Position.
Figure 14:
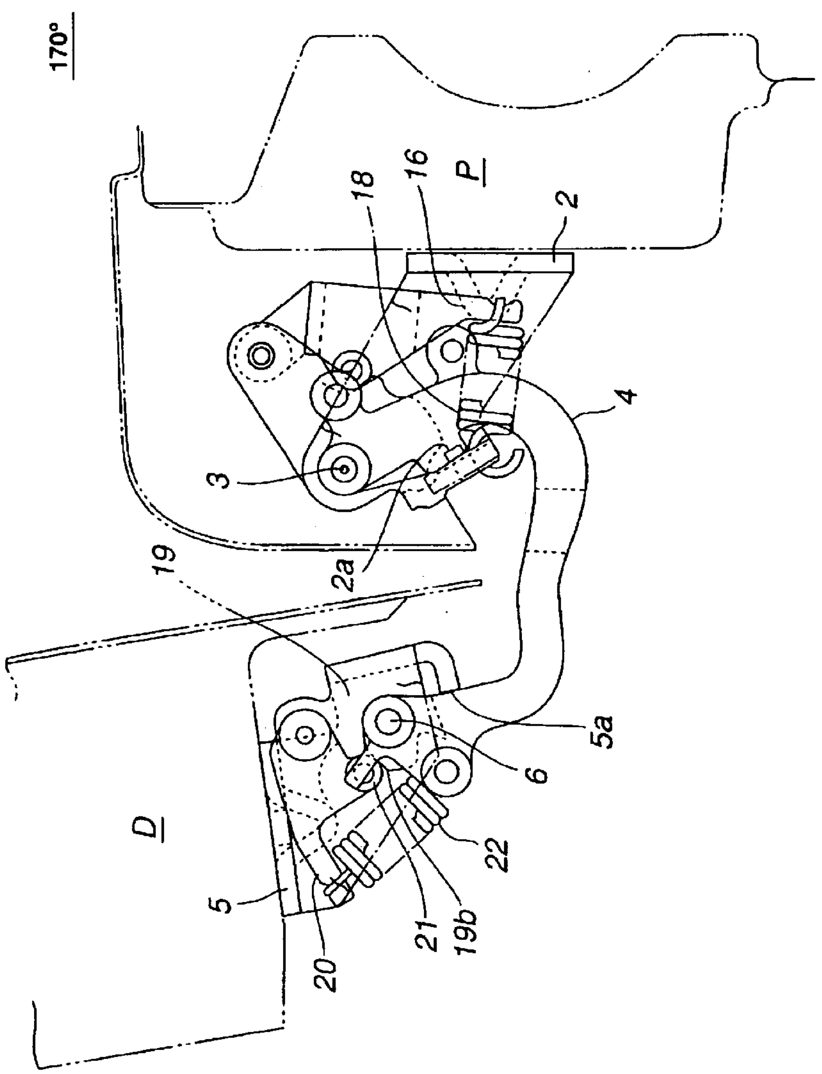
FIG. 14 is a view similar to FIG. 10, but a view with some upper parts removed.

Opening Pivoting from 90-Degree Position to 170-Degree Position (FIGS. 10 and 14)

When then the door "D" is pulled further with a certain force, the contact of the projection 4*a* of the hinge arm member 4 with the raised part 2*a* of the first hinge base member 2 prevents further rotation of the hinge arm member 4 about the first pivot shaft 3, and the leading end 8*a* of the first control lever 8 (see FIG. 4) is about to be slipped to the inclined surface part 7*b* from the curved surface part 7*a* of the first cam 7.

Under this condition, the pivot axis of the rear door "D" is about to switch from the first pivot shaft 3 to the second pivot shaft 6 carrying out the following operation.

In response to stopping of rotation of the hinge arm member 4 about the first pivot shaft 3 due to abutment of the projection 4*a* with the raised part 2*a*, the door "D" is forced to restart its pivoting about the second pivot shaft 6. That is, due to the stand-by condition of the leading end of the first control lever 8 for engagement with the inclined surface part 7*b* of the first cam 7, the link member 11 becomes released from the restriction. Thus, in response to the further pivoting of the door "D", the inclined surface part 9*b* (see FIG. 4) of the second cam 9 pushes the leading end 10*a* of the second control lever 10 causing rotation of the lever 10 about the pivot pin 24 and thus moving the link member 11 toward the second hinge base member 5 (viz., leftward in FIG. 4) against the biasing force of the biasing spring 14. As has been mentioned hereinabove, the biasing spring 14 functions to constantly bias the link member 11 toward the first hinge base member 2, that is, rightward in FIG. 4. For smoothly and assuredly pressing the second control lever 10 with the second cam 9, the leading end 10*a* of the second control lever 10 has a portion that extends radially outward from the curved surface part 9*a* of the second cam 9, as shown. Due to the further opening moving of the door "D" that induces the leftward movement of the link member 11, the leading end 10*a* of the second control lever 10 is slipped from the inclined surface part 9*b* to the curved surface part 9*a* of the second cam 9. Upon this, the leading end 8*a* of the first control lever 8 is slipped into the inclined surface part 7*b* from the curved surface part 7*a* of the first cam 7 thereby restricting rotation of the hinge arm 4 about the first pivot shaft 3 in a closing direction of the door "D". That is, switching of the pivoting axis of the door "D" from the first pivot shaft 3 to the second pivot shaft 6 is completed. This pivot shaft switching is instantly carried out when the door "D" is pulled outward from 90-degree Position.

Thus, thereafter, the door "D" is forced to pivot about the second pivot shaft 6 to which the other end of the hinge arm member 4 is pivotally connected. When the door "D" is further pivoted to 170-degree Position using the second pivot shaft 6 as a pivot shaft, the press roller 21 is brought into engagement with an end surface 19*b* of the cam portion 19 as is seen from FIG. 14. When the door "D" comes to this 170-degree Position, a stopper 5*a* (see FIGS. 10 and 14) provided by the second hinge base member 5 becomes in abutment with the hinge arm member 4 thereby to suppress further opening movement of the door "D".

In the following, operation of the hinge mechanism 100 in case of closing the door "D" will be described.

As will be apparent from the following description, in this case, the various parts take generally a reversed operation or movement.

Closing Pivoting from 170-Degree Position to 90-Degree Position when, now, the door "D" in 170-degree Position is pulled (or pushed) in a direction to close the door opening with a force overcoming the biasing force produced by the check mechanism, the hinge mechanism 100 takes an operation that is reversed to that of the above-mentioned Opening Pivoting from 90-degree Position to 170-degree Position. That is, the door "D" is pivoted about the second pivot shaft 6 until the same comes to a position near 90-degree Position.

When the door "D" comes to the position near 90-degree Position, the press roller 21 of the second check plate 20 is put into the recess 19*a* of the cam portion 19 (see FIG. 5). With this, the press roller 21 functions as both a position holder and a stopper, and thus the door "D" is restricted from pivoting about the second pivot shaft 6 in a closing direction. At the same time, the leading end 10*a* of the second control lever 10 (see FIG. 4) is released from the curve surface part 9*a* of the second cam 9 and takes a stand-by position for engagement with the inclined surface part 9*b* of the second cam 9. In response to the release action of the leading end 10*a* of the second control lever 10 from the curved surface part 9*a* of the second cam 9, the link member 11 becomes free and thus is pulled toward the first hinge base member 2 by the biasing spring 14. With this, the leading end 8*a* of the first control lever 8 is released from the inclined surface part 7*b* of the first cam 7 and takes a stand-by position for engagement with the curved surface part 7*a* of the first cam 7. Upon this, the pivot axis of the door "D" switches back from the second pivot shaft 6 to the first pivot shaft 3. That is, the movement of the link member 11 toward the first hinge base member 2 induces such switching of the pivot shaft of the door "D" from the second pivot shaft 6 to the first pivot shaft 3. That is, restriction of the hinge arm member 4 becomes cancelled and thus the hinge arm member 4 and the door "D" are caused to pivot about the first pivot shaft 3 like a single unit.

When the door "D" comes to 90-degree Position, the same is retained or held at this position by the function of a check mechanism including the first check plate 16, the press roller 17, the cam portion 15 and the spring 18. That is, in this position, the door "D" is resiliently held with a certain biasing force. In this case, the leading end 8*a* of the first control lever 8 (see FIG. 4) is in contact with the curved surface part 7*a* of the first cam 7 suppressing movement of the link member 11 and thus the leading end 10*a* of the second control lever 10 is caused to keep the engagement with the inclined surface part 9*b* of the second cam 9. Upon this, the pivoting of the door "D" about the second pivot shaft 6 becomes suppressed.

Closing Pivoting from 90-Degree Position to 0-Degree Position

When then the door "D" is pushed in a direction to close the same with a force overcoming the biasing of the check mechanism, the same is pivoted to 0-degree Position (viz., fully closed position) simply passing through the check transition at 60-degree Position. When the door "D" takes the fully closed position, the parts of the hinge mechanism 100 assume their original positions as has been described hereinabove.

In the following, unique features of the present invention and advantages possessed by the unique features will be briefly described.

Check Mechanism

In the hinge mechanism 100 of the present invention, to the first and second hinge base members 2 and 5, there are pivotally connected the first and second check plates 16 and 20 respectively, each being biased toward a cam portion 15 or 19 by the spring 18 or 22. The spring 18 extends between the first check plate 16 and the first hinge base member 2, while the other spring 22 extends between the second check plate 20 and the second hinge base member 5. The first check plate 16 has the press roller 17 pressed against the cam portion 15 with the aid of the spring 18 and the second check plate 20 has the other press roller 21 pressed against the cam portion 19 with the aid of the spring 22. Due to the incorporated operation of the parts, the check feeling is given at each check position of the door "D", as has been mentioned hereinabove. In the present invention, the cam portions 15 and 19 are integral with the hinge arm member 4, the first and second check plates 16 are 20 are pivotally connected to the first and second hinge base members 2 and 5 respectively, and the press rollers 17 and 21 provided on the first and second check plates 16 and 20 are biased to contact with the cam portions 15 and 19 due to the work of the springs 18 and 22. This arrangement is very simple and thus the hinge mechanism 100 of the invention can be assembled easily with reduced assembling steps, which brings about a reduction in cost of the hinge mechanism 100.

In the invention, in response to the open/close pivoting of the door "D", the cam portion 15 is moved in the side of the first hinge member 2 and the second check plate 20 and the press roller 21 are moved in the side of the second hinge member 5. Accordingly, even when the door "D" is pivoted, the press roller 17 is suppressed from making a displacement in a radial direction from the pivot axis (viz., pin 16*a*) of the first check plate 16. Thus, setting of the check force of the check mechanism is easily made and thus a comfortable check feeling is given each time the door "D" passes the check positions. Furthermore, when the door "D" is pivoted, the second check plate 20 is moved together with the second hinge base member 5. This brings about a compact and simple arrangement of the parts located near the second hinge base member 5.

Pivot Shaft Switching Mechanism

This switching mechanism comprises the paired cam portions 15 and 19, the first and second control levers 8 and 10 and the link member 11 through which the control levers 8 and 10 are connected. With this arrangement, the pivot axis of the door "D" is automatically switched between the first and second pivot shafts 3 and 6 in accordance with the angular position of the door "D". For assuring the pivot shaft switching operation of the mechanism, there is employed the biasing spring 14 that constantly biases the link member 11 toward the first hinge base member 2. With this arrangement, the engagement and disengagement of the press roller 17 or 21 with and from the cam portion 15 or 19 are effectively made in a snap action manner. Thus, undesirable play inevitably produced when the pivot shaft switching operation is carried out is minimized and thus smoothed switching between the two pivot shafts 3 and 6 is obtained. Because the leading end 10*a* of the second control lever 10 (see FIG. 4) has such a size as to project in a radial direction from the curved surface part 9*a* of the second cam 9, the pressing of the second cam 9 to the second control lever 10 is smoothly carried out. Thus, the pivot shaft switching is smoothly made particularly at the time when the door "D" is under opening movement.

Although the foregoing description is directed to a hinge mechanism 100 that is applied to the rear door "D" mounted on a side wall of the vehicle body, the hinge mechanism 100 of the present invention can be applied to a back door or tail gate that is pivotally mounted on a back wall or back end of the vehicle body.

Although the invention has been described above with reference to the embodiment of the invention, the invention is not limited to such embodiment as described above. Various modifications and variations of such embodiment may be carried out by those skilled in the art, in light of the above description.

What is claimed is:

1. A hinge mechanism for pivotally connecting a door to a vehicle body, comprising:

first and second hinge base members adapted to be connected to the vehicle body and the door respectively;

first and second pivot shafts held by the first and second hinge base members respectively;

a hinge arm member having a first end portion pivotally connected to the first hinge base member through the first pivot shaft and a second end portion pivotally connected to the second hinge base member through the second pivot shaft;

first and second cams provided by the first and second hinge base members respectively;

a first control lever pivotally connected to the first end portion of the hinge arm member and having a leading end contactable with the first cam;

a second control lever pivotally connected to the second end portion of the hinge arm member and having a leading end contactable with the second cam;

a link member having opposed ends pivotally connected to the first and second control levers respectively;

first and second cam portions provided by the first and second end portions of the hinge arm member respectively;

first and second check plates pivotally connected to the first and second hinge base members respectively;

first and second follower members mounted on the first and second check plates respectively and contactable with the first and second cam portions respectively; and first and second biasing members for biasing the first and second check plates in a direction to press the first and second follower members on the first and second cam portions respectively.

2. A hinge mechanism for pivotally connecting a door to a vehicle body, comprising:

first and second hinge base members adapted to be connected to the vehicle body and the door respectively;

first and second pivot shafts held by the first and second hinge base members respectively;

a hinge arm member having a first end portion pivotally connected to the first hinge base member through the first pivot shaft and a second end portion pivotally connected to the second hinge base member through the second pivot shaft;

first and second cams provided by the first and second hinge base members respectively;

a first control lever pivotally connected to the first end portion of the hinge arm member and having a leading end contactable with the first cam;

a second control lever pivotally connected to the second end portion of the hinge arm member and having a leading end contactable with the second cam;

a link member having opposed ends pivotally connected to the first and second control levers respectively;

first and second cam portions provided by the first and second end portions of the hinge arm member respectively;

first and second check plates pivotally connected to the first and second hinge base members respectively;

first and second follower members mounted on the first and second check plates respectively and contactable with the first and second cam portions respectively; and first and second biasing members for biasing the first and second check plates in a direction to press the first and second follower members on the first and second cam portions respectively, further comprising a third biasing member that biases the link member toward the first hinge base member.

3. A hinge mechanism as claimed in claim 2, in which the first and second pivot shafts are secured to the first and second hinge base members respectively, the first and second cams are secured to the first and second pivot shafts respectively and the first and second end portions of the hinge arm members are pivotally connected to the first and second pivot shafts respectively.

4. A hinge mechanism as claimed in claim 2, in which the third biasing member is a coil spring that has one end hooked to the first hinge base member and the other end hooked to the first end portion of the link member.

5. A hinge mechanism as claimed in claim 2, in which the first and second follower members are press rollers rotatably mounted on the first and second check plates respectively.

6. A hinge mechanism as claimed in claim 2, in which the first biasing member is a coil spring that has one end hooked to the first hinge base member and the other end hooked to the first check plate, and in which the second biasing member is a coil spring that has one end hooked to the second hinge base member and the other end hooked to the second check plate.

7. A hinge mechanism as claimed in claim 2, in which each of the first and second cams comprises a curved surface part and an inclined surface part.

8. A hinge mechanism as claimed in claim 7, in which the leading end of the second control lever has such a size as to project in a radial direction from the curved surface part of the second cam.

9. A hinge mechanism as claimed in claim 7, in which the pivoting movement of the door about the first pivot shaft is permitted only when the leading end of the first control lever is in contact with the curved surface part of the first cam, and in which the pivoting movement of the door about the second pivot shaft is permitted only when the leading end of the second control lever is in contact with the curved surface part of the second cam.

10. A hinge mechanism as claimed in claim 9, in which when, due to an opening pivoting of the door about the first pivot shaft, the leading end of the first control lever is slept into the inclined surface part of the first cam from the curved surface part of the same, the link member moves the second control lever in a direction to cause the leading end of the second control lever to get on the curved surface part of the second cam from the inclined surface part of the same.

11. A hinge mechanism for pivotally connecting a door to a vehicle body, comprising:

first and second hinge base members adapted to be connected to the vehicle body and the door respectively;

first and second pivot shafts held by the first and second hinge base members respectively;

a hinge arm member having a first end portion pivotally connected to the first hinge base member through the first pivot shaft and a second end portion pivotally connected to the second hinge base member through the second pivot shaft;

first and second cams provided by the first and second hinge base members respectively;

a first control lever pivotally connected to the first end portion of the hinge arm member and having a leading end contactable with the first cam;

a second control lever pivotally connected to the second end portion of the hinge arm member and having a leading end contactable with the second cam;

a link member having opposed ends pivotally connected to the first and second control levers respectively; and a biasing member that biases the link member toward the first hinge base member.

12. A hinge mechanism as claimed in claim 11, further comprising:

first and second cam portions provided by the first and second end portions of the hinge arm member respectively;

first and second check plates pivotally connected to the first and second hinge base members respectively;

first and second press rollers rotatably mounted on the first and second check plates respectively and contactable with the first and second cam portions respectively; and first and second springs that bias the first and second check plates in a direction to press the first and second press rollers on the first and second cam portions respectively.

13. A hinge mechanism as claimed in claim 12, in which the leading end of the second control lever has such a size as to project in a radial direction from a curved surface part of the second cam.

14. A hinge mechanism for pivotally connecting a door to a vehicle body, comprising:

first and second hinge base members adapted to be connected to the vehicle body and the door respectively;

first and second pivot shafts tightly held by the first and second hinge base members respectively;

a hinge arm member having a first end portion pivotally connected to the first pivot shaft and a second end portion pivotally connected to the second pivot shaft;

first and second cams provided by the first and second pivot shafts respectively;

a first control lever pivotally connected to the first end portion of the hinge arm member and having a leading end contactable with the first cam;

a second control lever pivotally connected to the second end portion of the hinge arm member and having a leading end contactable with the second cam;

a link member having opposed ends pivotally connected to the first and second control levers respectively;

first and second cam portions integrally formed on the first and second end portions of the hinge arm member respectively;

first and second check plates pivotally connected to the first and second hinge base members respectively;

first and second press rollers rotatably mounted on the first and second check plates respectively and contactable with the first and second cam portions respectively;

first and second springs that bias the first and second check plates in a direction to press the first and second press rollers on the first and second cam portions respectively; and a third spring that biases the link member toward the first hinge base member.

* * * * *